US011271360B2

(12) United States Patent
Fuchimukai et al.

(10) Patent No.: US 11,271,360 B2
(45) Date of Patent: Mar. 8, 2022

(54) WAVELENGTH CONVERTER

(71) Applicant: Gigaphoton Inc., Tochigi (JP)

(72) Inventors: Atsushi Fuchimukai, Oyama (JP);
Osamu Wakabayashi, Oyama (JP);
Yoichi Sasaki, Oyama (JP)

(73) Assignee: Gigaphoton Inc., Tochigi (JP)

( * ) Notice: Subject to any disclaimer, the term of this patent is extended or adjusted under 35 U.S.C. 154(b) by 109 days.

(21) Appl. No.: 16/731,408

(22) Filed: Dec. 31, 2019

(65) Prior Publication Data

US 2020/0136339 A1     Apr. 30, 2020

Related U.S. Application Data

(63) Continuation of application No. PCT/JP2017/029922, filed on Aug. 22, 2017.

(51) Int. Cl.
*H01S 3/109*     (2006.01)
*H01S 3/02*     (2006.01)
(Continued)

(52) U.S. Cl.
CPC .............. *H01S 3/109* (2013.01); *H01S 3/027* (2013.01); *H01S 3/06758* (2013.01);
(Continued)

(58) Field of Classification Search
CPC ...... H01S 3/109; H01S 3/027; H01S 3/06758; H01S 3/1608; H01S 3/1618;
(Continued)

(56) References Cited

U.S. PATENT DOCUMENTS

| 5,430,756 A | 7/1995 | Hanihara |
| 6,414,784 B1 | 7/2002 | Oosako et al. |
| | (Continued) | |

FOREIGN PATENT DOCUMENTS

| CN | 101498877 A | 8/2009 |
| CN | 101923265 A | 12/2010 |
| | (Continued) | |

OTHER PUBLICATIONS

International Search Report issued in PCT/JP2017/029922; dated Oct. 24, 2017.

(Continued)

*Primary Examiner* — Xinning (Tom) Niu
(74) *Attorney, Agent, or Firm* — Studebaker & Brackett PC

(57) ABSTRACT

A wavelength converter including: A. a crystal holder configured to hold a nonlinear crystal configured to convert a wavelength of a laser beam incident thereon and output the wavelength-converted laser beam; B. a first container configured to accommodate the crystal holder and include a light incident window so provided as to intersect an optical path of the laser beam incident on the nonlinear crystal and a light exiting window so provided as to intersect the optical path of the laser beam having exited out of the nonlinear crystal; C. a second container configured to accommodate the first container; D. a position adjusting mechanism configured to adjust at least a position of the first container; and E. an isolation mechanism configured to spatially isolate the light incident window and the light exiting window from the position adjusting mechanism.

19 Claims, 10 Drawing Sheets

(51) Int. Cl.
*H01S 3/067* (2006.01)
*H01S 3/16* (2006.01)
*H01S 3/23* (2006.01)

(52) U.S. Cl.
CPC .......... *H01S 3/1608* (2013.01); *H01S 3/1618* (2013.01); *H01S 3/1643* (2013.01); *H01S 3/2391* (2013.01)

(58) Field of Classification Search
CPC .... H01S 3/1643; H01S 3/2391; H01S 3/2366; H01S 3/2251; H01S 3/2316; H01S 3/2375; H01S 3/0092; H01S 3/06754; G02F 1/3505; G02F 1/3507; G02F 1/353
See application file for complete search history.

(56) References Cited

U.S. PATENT DOCUMENTS

| | | | |
|---|---|---|---|
| 6,494,584 | B1 | 12/2002 | Wada et al. |
| 2001/0025924 | A1 | 10/2001 | Uto et al. |
| 2005/0225837 | A1* | 10/2005 | Kojima .................. G02F 1/3501 359/326 |
| 2007/0223541 | A1* | 9/2007 | Van Saarloos ........ G02F 1/3501 372/22 |
| 2007/0297466 | A1 | 12/2007 | Ghorbani et al. |
| 2010/0128343 | A1 | 5/2010 | Imai et al. |
| 2012/0002689 | A1* | 1/2012 | Wojcik ................... G01N 21/39 372/28 |
| 2015/0194781 | A1* | 7/2015 | Asayama ................ H01S 3/225 372/38.05 |
| 2015/0194784 | A1 | 7/2015 | Kwon et al. |
| 2017/0338617 | A1 | 11/2017 | Zhao et al. |

FOREIGN PATENT DOCUMENTS

| | | |
|---|---|---|
| CN | 104937789 A | 9/2015 |
| JP | H07-099353 A | 4/1995 |
| JP | 2000-284334 A | 10/2000 |
| JP | 2000-347234 A | 12/2000 |
| JP | 2001-296570 A | 10/2001 |
| JP | 2010-128119 A | 6/2010 |
| JP | 2011-507305 A | 3/2011 |
| JP | 2011-211234 A | 10/2011 |
| JP | 2015-527602 A | 9/2015 |
| WO | 02/48786 A1 | 6/2002 |
| WO | 2009/082460 A2 | 7/2009 |
| WO | 2013/192012 A2 | 12/2013 |
| WO | 2016/143071 A1 | 9/2016 |

OTHER PUBLICATIONS

International Preliminary Report On Patentability and Written Opinion issued in PCT/JP2017/029922; dated Feb. 25, 2020.
An Office Action mailed by China National Intellectual Property Administration dated Dec. 22, 2021, which corresponds to Chinese Patent Application No. 201780092681.0 and is related to U.S. Appl. No. 16/731,408; with English language translation.

* cited by examiner

WAVELENGTH CONVERTER

CROSS-REFERENCE TO RELATED APPLICATIONS

The present application is a continuation application of International Application No. PCT/JP2017/029922 filed on Aug. 22, 2017. The content of the application is incorporated herein by reference in its entirety.

BACKGROUND

1. Technical Field

The present disclosure relates to a wavelength converter used in a laser apparatus.

2. Related Art

A semiconductor exposure apparatus is required to improve the resolution as a semiconductor integrated circuit is increasingly miniaturized and highly integrated. A semiconductor exposure apparatus is hereinafter simply referred to as an "exposure apparatus." To improve the resolution of an exposure apparatus, reduction in the wavelength of the light emitted from a light source for exposure is underway. A gas laser apparatus is used as the light source for exposure in place of a mercury lamp in related art. At present, a KrF excimer laser apparatus configured to emit ultraviolet light having a wavelength of 248 nm or an ArF excimer laser apparatus configured to emit ultraviolet light having a wavelength of 193.4 nm is used as a laser apparatus for exposure.

As a current exposure technology, liquid-immersion exposure, in which the gap between the exposure lens of the exposure apparatus and a wafer is filled with a liquid, has been put into use. In the liquid-immersion exposure, since the refractive index of the gap changes, the apparent wavelength of the light from the light source for exposure shortens. In the liquid-immersion exposure using an ArF excimer laser apparatus as the light source for exposure, the wafer is irradiated with ultraviolet light having a wavelength of 134 nm in water. The technology described above is called ArF liquid-immersion exposure. The ArF liquid-immersion exposure is also called ArF liquid-immersion lithography.

Since KrF and ArF excimer laser apparatuses each have a wide spectral linewidth ranging from about 350 to 400 pm in spontaneous oscillation, the chromatic aberrations occur in association with the laser beam (ultraviolet light) projected with the size thereof reduced onto the wafer via the projection lens of the exposure apparatus, resulting in a decrease in the resolution of the projection lens. To avoid the decrease in the resolution, the spectral linewidth of the laser beam emitted from the gas laser apparatus needs to be narrow enough to make the chromatic aberrations negligible. A line narrowing module including a line narrowing element is therefore provided in the laser resonator of the gas laser apparatus. The line narrowing module narrows the spectral linewidth. For example, the line narrowing element may be an etalon or a grating. A laser apparatus having a narrowed spectral linewidth described above is referred to as a narrowed-linewidth laser apparatus.

Some laser apparatus for exposure apparatus each use a solid-state laser apparatus from the viewpoint of energy conservation. The solid-state laser apparatus includes a semiconductor laser, a nonlinear crystal, and other components.

CITATION LIST

Patent Literature

[PTL 1] JP-A-2001-296570
[PTL 2] JP-T-2011-507305
[PTL 3] JP-A-2000-347234
[PTL 4] JP-A-2010-128119
[PTL 5] JP-A-2011-211234

SUMMARY

A wavelength converter according to a viewpoint of the present disclosure includes the following:

A. a crystal holder that holds a nonlinear crystal configured to convert a wavelength of a laser beam incident thereon and output the wavelength-converted laser beam;

B. a first container configured to accommodate the crystal holder and include a light incident window so provided as to intersect an optical path of the laser beam incident on the nonlinear crystal and a light exiting window so provided as to intersect the optical path of the laser beam having exited out of the nonlinear crystal;

C. a second container configured to accommodate the first container; D. a position adjusting mechanism configured to adjust at least a position of the first container; and E. an isolation mechanism configured to spatially isolate the light incident window and the light exiting window from the position adjusting mechanism.

BRIEF DESCRIPTION OF THE DRAWINGS

Embodiments of the present disclosure will be described below only by way of example with reference to the accompanying drawings.

DETAILED DESCRIPTION

Figure 1:
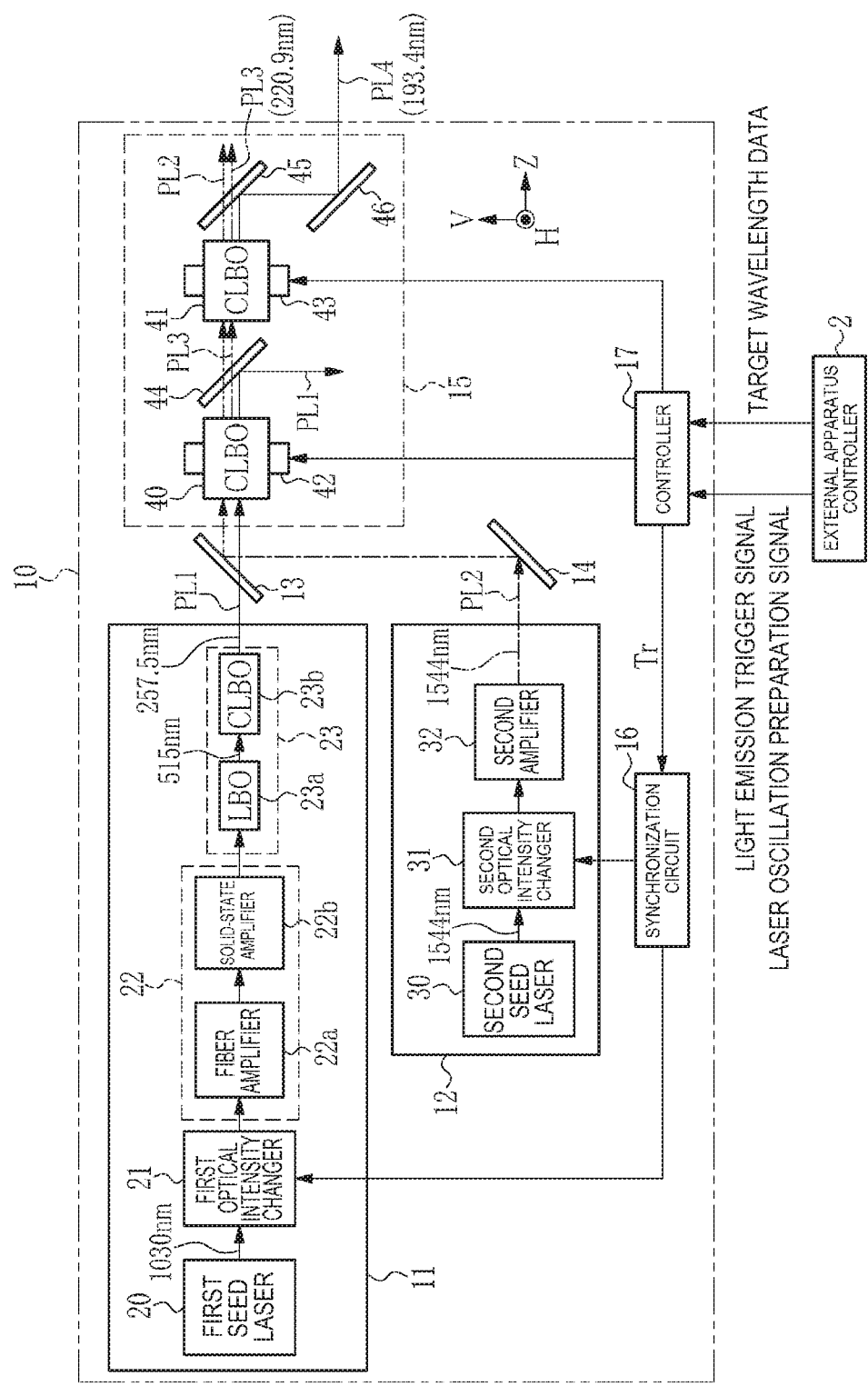
FIG. 1 schematically shows the configuration of a solid-state laser system according to Comparative Example.

<Contents>
1. Comparative Example
1.1 Configuration
1.2 Operation
1.3 Problems

2. First Embodiment
2.1 Configuration
2.2 Operation
2.3 Effects
3. Second Embodiment
3.1 Configuration
3.2 Operation
3.3 Effects
4. Third Embodiment
4.1 Configuration
4.2 Operation
4.3 Effects
4.4 Variation
5. Fourth Embodiment
5.1 Configuration
5.2 Effects
6. Various variations Embodiments of the present disclosure will be described below in detail with reference to the drawings. The embodiments described below show some examples of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Comparative Example 1.1 Configuration
1.1.1 Overall Configuration

FIG. 1 schematically shows the configuration of a solid-state laser system 10 according to Comparative Example. In FIG. 1, the solid-state laser system 10 includes a first solid-state laser apparatus 11, a second solid-state laser apparatus 12, a dichroic mirror 13, a high-reflectance mirror 14, a wavelength conversion system 15, a synchronization circuit 16, and a controller 17.

The first solid-state laser apparatus 11 includes a first seed laser 20, a first optical intensity changer 21, a first amplifier 22, and a wavelength converter 23. The first amplifier 22 includes a fiber amplifier 22a, a solid-state amplifier 22b, and a CW-excitation semiconductor laser that is not shown. The wavelength converter 23 includes an LBO (LiB$_3$O$_5$) crystal 23a and a CLBO (CsLiB$_6$O$_{10}$) crystal 23b. The LBO crystal 23a and the CLBO crystal 23b are each a nonlinear crystal.

The first seed laser 20 outputs a single-longitudinal-mode CW or pulsed beam having a wavelength of about 1030 nm as a first seed beam. For example, the first seed laser 20 is a distributed feedback semiconductor laser. The first optical intensity changer 21 includes a semiconductor device on which the first seed beam is incident from the first seed laser 20. The first optical intensity changer 21 converts the first seed light into a laser beam having a predetermined pulse width by causing a current controller that is not shown to apply pulsed current to the semiconductor device. The first seed beam converted by the first optical intensity changer 21 is hereinafter referred to as a first seed pulsed beam.

The fiber amplifier 22a is formed of a plurality of quartz fibers to which Yb is doped and which are connected to each other for multi-stage amplification. The solid-state amplifier 22b is a YAG crystal to which Yb is doped. The fiber amplifier 22a and the solid-state amplifier 22b are optically excited with CW excitation beam inputted from the CW-excitation semiconductor laser that is not shown. The first amplifier 22 amplifies the first seed pulsed beam incident from the first optical intensity changer 21.

The wavelength converter 23 converts the first seed pulsed beam amplified by the first amplifier 22 into a harmonic beam and outputs the harmonic beam as a first pulsed laser beam PL1. Specifically, the wavelength converter 23, which includes the LBO crystal 23a and the CLBO crystal 23b, produces a fourth harmonic beam having a wavelength of about 257.5 nm from the first seed pulsed beam and outputs the fourth harmonic beam as the first pulsed laser beam PL1.

The second solid-state laser apparatus 12 includes a second seed laser 30, a second optical intensity changer 31, and a second amplifier 32. The second amplifier 32 includes an Er fiber amplifier that is not shown and is formed of a plurality of quartz fibers to which Er and Yb are doped and which are connected to each other for multi-stage amplification, and the second amplifier 32 further includes a CW-excitation semiconductor laser that is not shown.

The second seed laser 30 outputs a single-longitudinal-mode CW or pulsed beam having a wavelength of about 1554 nm as a second seed beam. For example, the second seed laser 30 is a distributed feedback semiconductor laser. The second optical intensity changer 31 includes a semiconductor device on which the second seed beam is incident from the second seed laser 30. The second optical intensity changer 31 converts the second seed light into a laser beam having a predetermined pulse width by causing a current controller that is not shown to apply pulsed current to the semiconductor device. The second seed beam converted by the second optical intensity changer 31 is hereinafter referred to as a second seed pulsed beam.

The Er fiber amplifier provided in the second amplifier 32 is optically excited with CW excitation beam inputted from the CW-excitation semiconductor laser that is not shown. The second amplifier 32 amplifies the second seed pulsed beam incident from the second optical intensity changer 31. The second amplifier 32 outputs the amplified second seed pulsed beam as a second pulsed laser beam PL2.

The dichroic mirror 13 is so disposed as to receive the first pulsed laser beam PL1 outputted from the first solid-state laser apparatus 11. The high-reflectance mirror 14 is so disposed as to reflect the second pulsed laser beam PL2 outputted from the second solid-state laser apparatus 12 at high reflectance and cause the second pulsed laser beam PL2 reflected at high reflectance to be incident on the dichroic mirror 13.

The dichroic mirror 13 is coated with a film which transmits the first pulsed laser beam PL1 having the wavelength of about 257.5 nm at high transmittance and reflects the second pulsed laser beam PL2 having the wavelength of about 1554 nm at high reflectance. The dichroic mirror 13 is so disposed that the optical path axis of the first pulsed laser beam PL1 that the dichroic mirror 13 has transmitted at high transmittance coincides with the optical path axis of the second pulsed laser beam PL2 that the dichroic mirror 13 has reflected at high reflectance.

The wavelength conversion system 15 includes a first CLBO crystal 40, a second CLBO crystal 41, a first position adjusting mechanism 42, a second position adjusting mechanism 43, a first dichroic mirror 44, a second dichroic mirror 45, and a high-reflectance mirror 46. The first CLBO crystal 40 and the second CLBO crystal 41 are each a nonlinear crystal.

The first CLBO crystal 40, the first dichroic mirror 44, the second CLBO crystal 41, and the second dichroic mirror 45 are arranged in the presented order along the optical paths of the first pulsed laser beam PL1 and the second pulsed laser beam PL2. The first pulsed laser beam PL1 and the second pulsed laser beam PL2 are incident on the first CLBO crystal 40.

The first CLBO crystal 40 superimposes the first pulsed laser beam PL1 and the second pulsed laser beam PL2 on each other into a third pulsed laser beam PL3 having a wavelength of about 220.9 nm corresponding to the sum frequency of the wavelength of about 257.5 nm and the wavelength of about 1554 nm. The first pulsed laser beam PL1 and the second pulsed laser beam PL2 pass through the first CLBO crystal 40.

The first dichroic mirror 44 is coated with a film which reflects the first pulsed laser beam PL1 at high reflectance and transmits the second pulsed laser beam PL2 and the third pulsed laser beam PL3 at high transmittance. The second pulsed laser beam PL2 and the third pulsed laser beam PL3 that the first dichroic mirror 44 has transmitted at high transmittance are incident on the second CLBO crystal 41.

The second CLBO crystal 41 superimposes the second pulsed laser beam PL2 and the third pulsed laser beam PL3 on each other into a fourth pulsed laser beam PL4 having a wavelength of about 193.4 nm corresponding to the sum frequency of the wavelength of about 1554 nm and the wavelength of about 220.9 nm. The second pulsed laser beam PL2 and the third pulsed laser beam PL3 pass through the second CLBO crystal 41.

The second dichroic mirror 45 is coated with a film which reflects the fourth pulsed laser beam PL4 at high reflectance and transmits the second pulsed laser beam PL2 and the third pulsed laser beam PL3 at high transmittance. The high-reflectance mirror 46 is so disposed as to reflect at high reflectance the fourth pulsed laser beam PL4 that the second dichroic mirror 45 has reflected at high reflectance and outputs the reflected fourth pulsed laser beam PL4 from the wavelength conversion system 15.

The first position adjusting mechanism 42 adjusts the position of the first CLBO crystal 40. Specifically, the first position adjusting mechanism 42 linearly drives the first CLBO crystal 40 in the directions along axes V and H and rotationally drives the first CLBO crystal 40 in a direction θ, which is the rotational direction around the axis H. The axes H, V, and Z are perpendicular to one another. The axis-Z direction is the direction along the optical path axes of the first pulsed laser beam PL1 and the second pulsed laser beam PL2 that enter the wavelength conversion system 15. For example, the axis-H direction is the vertical direction.

The second position adjusting mechanism 43 adjusts the position of the second CLBO crystal 41. The configuration of the second position adjusting mechanism 43 is the same as the configuration of the first position adjusting mechanism 42. The second position adjusting mechanism 43 linearly drives the second CLBO crystal 41 in the axis-V and axis-H directions and rotationally drives the second CLBO crystal 41 in the direction θ.

The controller 17 is electrically connected to the first position adjusting mechanism 42 and the second position adjusting mechanism 43 and controls the driving operation performed by the first position adjusting mechanism 42 and the second position adjusting mechanism 43. The controller 17 is also electrically connected to the synchronization circuit 16. The synchronization circuit 16 is electrically connected to the first optical intensity changer 21 and the second optical intensity changer 31. The synchronization circuit 16 controls the first optical intensity changer 21 and the second optical intensity changer 31 based on a trigger signal Tr inputted from the controller 17 to synchronize the timings at which the first seed pulsed beam and the second seed pulsed beam are generated with each other. The controller 17 is further electrically connected to the first seed laser 20, the second seed laser 30, the CW-excitation semiconductor laser provided in the first amplifier 22, and the CW-excitation semiconductor laser provided in the second amplifier 32 via signal lines that are not shown.

The controller 17 receives a laser oscillation preparation signal, a light emission trigger signal, and target wavelength data from an external apparatus controller 2 provided in an exposure apparatus that is not shown and controls the first position adjusting mechanism 42, the second position adjusting mechanism 43, the synchronization circuit 16, the first seed laser 20, the second seed laser 30, and other components.

1.1.2 Configurations of position adjusting mechanisms

Figure 2:
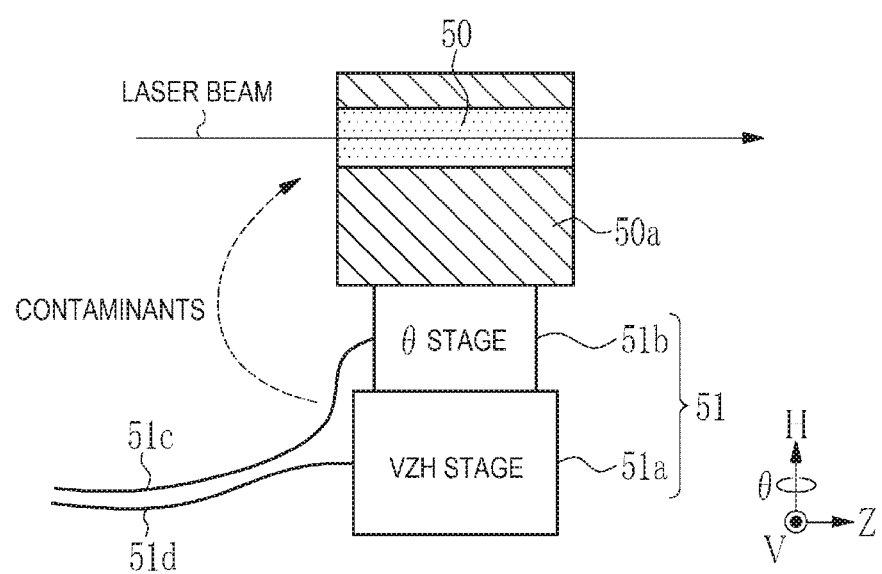
FIG. 2 shows the configuration of a position adjusting mechanism.

The configurations of the first position adjusting mechanism 42 and the second position adjusting mechanism 43 will next be described. FIG. 2 shows a position adjusting mechanism 51 used as the first position adjusting mechanism 42 or the second position adjusting mechanism 43 described above. A nonlinear crystal 50 is detachably held by a crystal holder 50a. The position adjusting mechanism 51 adjusts the position of the crystal holder 50a. The nonlinear crystal 50 is the first CLBO crystal 40 or the second CLBO crystal 41.

The position adjusting mechanism 51 includes a VZH stage 51a as a linear driver and a θ stage 51b as a rotational driver. The θ stage 51b is placed on the VZH stage 51a. The crystal holder 50a is placed on the θ stage 51b. The VZH stage 51a can linearly move the crystal holder 50a in the axis-V, axis-Z, and axis-H directions to change the position of the nonlinear crystal 50 with respect to the laser beam. The θ stage 51b can rotate the crystal holder 50a in the direction θ around the axis H to change the angle of incidence of the laser beam incident on the nonlinear crystal 50.

The VZH stage 51a and the θ stage 51b are each formed, for example, of a stepper motor that is not shown. A wiring line 51c and a wiring line 51d are connected to the VZH stage 51a and the θ stage 51b, respectively. The VZH stage 51a and the θ stage 51b are driven via the wiring line 51c and the wiring line 51d, respectively.

1.2 Operation

The operation of the solid-state laser system 10 according to Comparative Example will next be described. Upon reception of the laser oscillation preparation signal from the external apparatus controller 2, the controller 17 causes the first seed laser 20, the second seed laser 30, and the CW-excitation semiconductor lasers provided in the first amplifier 22 and the second amplifier 32 to start oscillating.

The first seed beam is thus outputted from the first seed laser 20 and inputted to the first optical intensity changer 21. Before a control signal that will be described later is inputted to the first optical intensity changer 21, the first optical intensity changer 21 suppresses the amplification of the first seed beam. Similarly, the second seed beam is thus outputted from the second seed laser 30 and inputted to the second optical intensity changer 31. Before a control signal that will be described later is inputted to the second optical intensity changer 31, the second optical intensity changer 31 suppresses the amplification of the second seed beam. The first amplifier 22 and the second amplifier 32 are optically excited with the CW excitation beams inputted from the CW-excitation semiconductor lasers that are not shown.

Upon reception of the light emission trigger signal from the external apparatus controller 2, the controller 17 transmits the trigger signal Tr to the synchronization circuit 16. Upon reception of the trigger signal Tr, the synchronization circuit 16 transmits control signals to the first optical intensity changer 21 and the second optical intensity changer 31. Upon reception of the control signal, the first optical intensity changer 21 amplifies the first seed beam only for a predetermined period to generate a first seed pulsed beam having a predetermined pulse width and causes the generated first seed pulsed beam to enter the first amplifier 22. Similarly, upon reception of the control signal, the second optical intensity changer 31 amplifies the second seed beam only for a predetermined period to generate a second seed pulsed beam having a predetermined pulse width and causes the generated second seed pulsed beam to enter the second amplifier 32.

Having entered the first amplifier 22 and the second amplifier 32, the first seed pulsed beam and the second seed pulsed beam are amplified based on stimulated emission. The first seed pulsed beam amplified by the first amplifier 22 enters the wavelength converter 23. The first seed pulsed beam having entered the wavelength converter 23 is converted into a fourth harmonic beam, which is outputted as the first pulsed laser beam PL1 from the first solid-state laser apparatus 11. On the other hand, the second seed pulsed beam amplified by the second amplifier 32 is outputted as the second pulsed laser beam PL2 from the second solid-state laser apparatus 12.

The first pulsed laser beam PL1 outputted from the first solid-state laser apparatus 11 passes through the dichroic mirror 13 at high transmittance and enters the wavelength conversion system 15. The second pulsed laser beam PL2 outputted from the second solid-state laser apparatus 12 is reflected off the high-reflectance mirror 14 at high reflectance, is reflected off the dichroic mirror 13 at high reflectance, and enters the wavelength conversion system 15.

The synchronization circuit 16 adjusts the timings at which the control signals described above are inputted to the first optical intensity changer 21 and the second optical intensity changer 31 in such a way that the first pulsed laser beam PL1 and the second pulsed laser beam PL2 having entered the wavelength conversion system 15 enter the first CLBO crystal 40 substantially at the same time.

The first pulsed laser beam PL1 and the second pulsed laser beam PL2 are superimposed on each other in the first CLBO crystal 40 into the third pulsed laser beam PL3, which is a beam having a frequency equal to the sum of the frequency of the first pulsed laser beam PL1 and the frequency of the second pulsed laser beam PL2. The first pulsed laser beam PL1 having passed through the first CLBO crystal 40 is reflected off the first dichroic mirror 44 at high reflectance. The second pulsed laser beam PL2 having passed through the first CLBO crystal 40 and the third pulsed laser beam PL3 pass through the first dichroic mirror 44 at high transmittance and enter the second CLBO crystal 41.

The second pulsed laser beam PL2 and the third pulsed laser beam PL3 are superimposed on each other in the second CLBO crystal 41 into the fourth pulsed laser beam PL4, which is a beam having a frequency equal to the sum of the frequency of the second pulsed laser beam PL2 and the frequency of the third pulsed laser beam PL3. The second pulsed laser beam PL2 and the third pulsed laser beam PL3 having passed through the second CLBO crystal 41 pass through the second dichroic mirror 45 at high transmittance. On the other hand, the fourth pulsed laser beam PL4 is reflected off the second dichroic mirror 45 at high reflectance, further reflected off the high-reflectance mirror 46 at high reflectance, and outputted from the wavelength conversion system 15.

The fourth pulsed laser beam PL4 outputted from the wavelength conversion system 15 is outputted from the solid-state laser system 10, amplified by an ArF excimer amplifier that is not shown, then inputted to the exposure apparatus that is not shown, and used as exposure light.

The controller 17 transmits the trigger signal Tr to the synchronization circuit 16 whenever the controller 17 receives the light emission trigger signal from the external apparatus controller 2. The fourth pulsed laser beam PL4 is thus repeatedly outputted from the solid-state laser system 10.

The controller 17 counts the number of actions of receiving the light emission trigger signal from the external apparatus controller 2 and causes the first position adjusting mechanism 42 and the second position adjusting mechanism 43 to operate whenever the count, that is, the number of shots reaches a predetermined number to linearly drive the CLBO crystals in the directions perpendicular to the directions along the optical path axes of the laser beams. Specifically, the controller 17 moves the first CLBO crystal 40 and the second CLBO crystal 41 by a predetermined distance in at least one of the axis-V and axis-H directions. The reason for this is to reduce damage of the first CLBO crystal 40 and the second CLBO crystal 41 resulting from a situation in which the ultraviolet pulsed laser beams keep being incident on a specific portion of each of the CLBO crystals and a situation in which the ultraviolet beams having undergone the wavelength conversion keep being generated. The crystal life of each of the first CLBO crystal 40 and the second CLBO crystal 41 can thus be prolonged.

The controller 17 changes the oscillation wavelength of the first seed laser 20 or the second seed laser 30 in accordance with the target wavelength data received from the external apparatus controller 2. Further, the controller 17 causes the first position adjusting mechanism 42 and the second position adjusting mechanism 43 to operate to rotate the CLBO crystals in the direction θ in accordance with the target wavelength data. Specifically, the controller 17 causes the first CLBO crystal 40 and the second CLBO crystal 41 to rotate in the direction θ in such a way that the angles of incidence of the laser beams incident on the first CLBO crystal 40 and the second CLBO crystal 41 are equal to phase matching angles corresponding to target wavelengths. As a result, even when the target wavelengths are changed, the angles of incidence of the laser beams always coincide with the phase matching angles, whereby the first CLBO crystal 40 and the second CLBO crystal 41 generate intensive sum-frequency beams.

1.3 Problems

The position adjusting mechanism 51 includes a driver, such as the stepper motor, as described above. The driver, such as the stepper motor, includes mechanical components, such as a gear, and therefore, a lubricant containing an organic substance, such as oil, is applied to the mechanical components to reduce friction therebetween. The nonlinear crystal 50 could therefore be contaminated when the organic substance contained in the lubricant is emitted in the form of outgas and the ultraviolet pulsed laser beams optically decompose the outgas.

Specifically, the outgas emitted from the driver in the position adjusting mechanism 51 is optically decomposed by the ultraviolet pulsed laser beams, and the decomposed outgas could adhere as contaminants to the surface of the nonlinear crystal 50. When the nonlinear crystal 50 is irradiated with the laser beams with the contaminants adhering to the surface of the nonlinear crystal 50, the transmittance of the laser beams decreases, and the surface of the crystal is damaged, undesirably resulting in a decrease in operational performance of the solid-state laser system 10.

Figure 3:
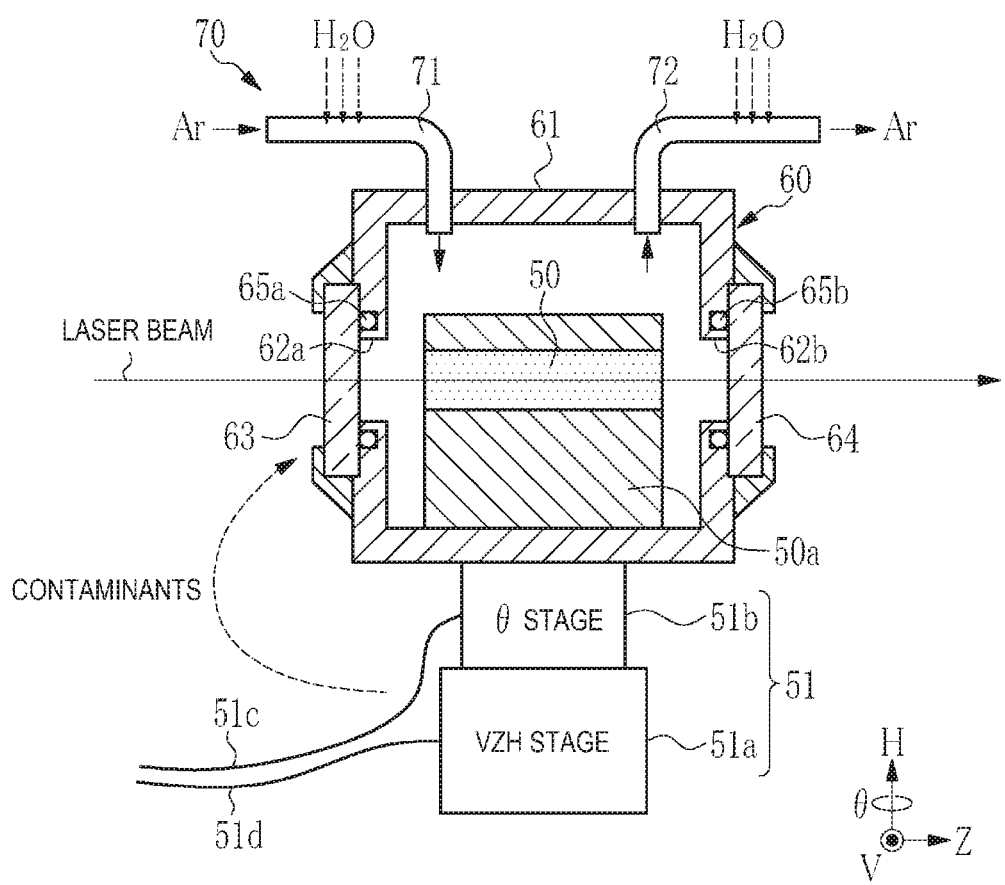
FIG. 3 describes problems with the solid-state laser system according to Comparative Example.

To prevent the contamination of the nonlinear crystal 50, it is conceivable to accommodate the nonlinear crystal 50 in a container and purge the container with a purge gas. Specifically, for example, the crystal holder 50a that holds the nonlinear crystal 50 is accommodated in a container 60, and the interior of the container 60 is purged by a purge mechanism 70, as shown in FIG. 3. In this case, the crystal holder 50a is fixed inside the container 60. The container 60 includes a container body 61, a light incident window 63, and light exiting window 64.

The container body 61 is made of aluminum or stainless steel (SUS). The container body 61 has a light-incident-side opening 62a so formed as to intersect the optical path of the laser beam incident on the nonlinear crystal 50. The container body 61 further has a light-exiting-side opening 62b so formed as to intersect the optical path of the laser beam that exits out of the nonlinear crystal 50. The light incident window 63 is so bonded to the container body 61 via an O ring 65a as to close the light-incident-side opening 62a. The light exiting window 64 is so bonded to the container body 61 via an O ring 65b as to close the light-exiting-side opening 62b.

An O ring is an annular seal member having a substantially circular cross-sectional shape. A resin ring made of Teflon (registered trademark), rubber or the like or a ceramic ring is used as the O ring. The configuration and material of each O ring described in the present specification are the same as the configuration and material described above.

The light incident window 63 and the light exiting window 64 are each formed of a substrate made of calcium fluoride ($CaF_2$) crystal or synthetic quartz, the two surfaces of which are coated with reflection suppressing films that are not shown. The light incident window 63 transmits the laser beam to cause the laser beam to be incident on the nonlinear crystal 50. The light exiting window 64 transmits the laser beam having exited out of the nonlinear crystal 50.

The purge mechanism 70 includes a gas introducing pipe 71, through which the purge gas is introduced into the container body 61, and a gas discharging pipe 72, through which the purge gas is discharged from the interior of the container body 61. The gas introducing pipe 71 is connected to a gas tank that is not shown. The gas discharging pipe 72 discharges the purge gas into the atmosphere. The gas discharging pipe 72 may be connected to a duct that is not shown but communicates with the atmosphere. The purge gas is a gas that hardly reacts with the CLBO crystal as the nonlinear crystal and is, for example, argon (Ar) gas. The purge gas is introduced into the container body 61 and discharged therefrom at a substantially fixed flow rate. Nitrogen ($N_2$) gas, which highly reacts with the CLBO crystal, cannot be used as the purge gas.

The container 60 is placed on the position adjusting mechanism 51, which linearly drives the container 60 in the axis-V, axis-Z, and axis-H directions and rotates the container 60 in the direction θ. The gas introducing pipe 71 and the gas discharging pipe 72 are each formed of a flexible duct to allow the movement of the container 60. It is preferable to use a resin tube as the flexible duct. It is further preferable that the resin tube emits only a small amount of outgas. For example, a fluorine-based resin tube made of Teflon (registered trademark) or the like is used as the flexible duct.

As described above, accommodating the nonlinear crystal 50 in the container 60 allows suppression of contamination of the nonlinear crystal 50 but has a possibility of contamination of the light incident window 63 and the light exiting window 64. Contaminants that adhere to the light incident window 63 and the light exiting window 64 could lower the transparency of the windows so that the transmittance of the laser beam undesirably decreases. Even a configuration in which the entire container 60 is purged with nitrogen gas or the like cannot prevent contamination of the light incident window 63 and the light exiting window 64 resulting from the outgas emitted from the position adjusting mechanism 51.

Further, a fluorine-based resin tube that forms each of the gas introducing pipe 71 and the gas discharging pipe 72 could undesirably transmit water. The nonlinear crystal 50, such as a CLBO crystal, has deliquescency. Therefore, when water penetrates through the gas introducing pipe 71 or the gas discharging pipe 72 into the container 60, the nonlinear crystal 50 could absorb the water, which causes erosion to occur and progress, resulting in a decrease in crystal life. In a case where the gas introducing pipe 71 and the gas discharging pipe 72 are each formed of a metal duct configured to allow no water penetration, it is difficult to adjust the position of the nonlinear crystal 50 because the metal duct has low flexibility.

2. First Embodiment

A solid-state laser apparatus according to a first embodiment of the present disclosure will next be described. The solid-state laser apparatus according to the first embodiment has the same configuration as the configuration of the solid-state laser apparatus according to Comparative Example shown in FIG. 1 except that the wavelength converters in the two solid-state laser apparatuses have different configurations. In the following description, substantially the same portions as the components of the solid-state laser apparatus according to Comparative Example shown in FIG. 1 have the same reference characters and will not be described as appropriate.

2.1 Configuration

Figure 4:
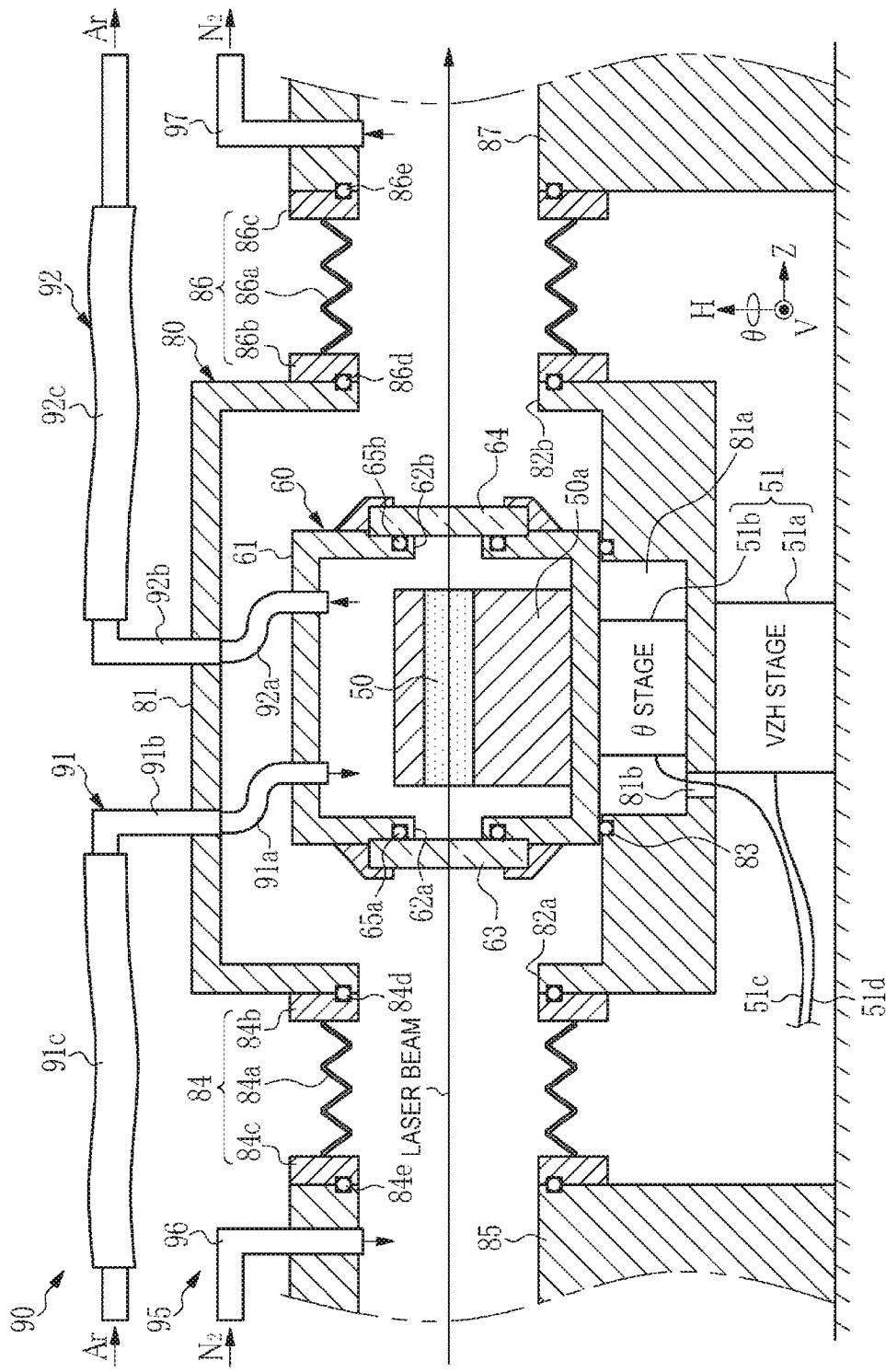
FIG. 4 shows the configuration of a wavelength converter according to a first embodiment.

FIG. 4 shows the configuration of the wavelength converter according to the first embodiment. The wavelength converter according to the first embodiment includes the crystal holder 50a, which holds the nonlinear crystal 50, the position adjusting mechanism 51, a first container 60, and a second container 80. The first container 60 has the same configuration as that of the container 60 according to Comparative Example and accommodates the crystal holder 50a that holds the nonlinear crystal 50. For example, the crystal holder 50a is made of copper.

The second container 80 includes a container body 81, a light-incident-side opening 82a, and a light-exiting-side opening 82b. The container body 81 is made of aluminum or SUS. The light-incident-side opening 82a is so provided as to intersect the optical path of the laser beam incident on the light incident window 63 of the first container 60. The light-exiting-side opening 82b is so provided as to intersect the optical path of the laser beam that exits through the light exiting window 64 of the first container 60.

The position adjusting mechanism 51 includes the VZH stage 51a and the θ stage 51b, as in Comparative Example. A recess 81a is formed in the bottom of the container body 81. The θ stage 51b is accommodated in the recess 81a. The first container 60 is placed on the θ stage 51b. The θ stage 51b rotates the container body 61 in the direction θ. The first container 60 is so disposed as to cover the recess 81a. A through hole 81b is formed in the bottom surface of the recess 81a. The wiring line 51c described above is inserted through the through hole 81b.

The recess 81a has a circular shape when viewed in the axis-H direction. An O ring 83 as an isolation mechanism is disposed in a portion of the upper end of the recess 81a that is the portion with which the bottom of the first container 60 is in contact. The O ring 83, which is in contact with the bottom of the first container 60 and the upper end of the recess 81a, spatially isolates the light incident window 63 and the light exiting window 64 of the first container 60 from the position adjusting mechanism 51. The O ring 83 may be a low-airtightness O ring that does not prevent the θ stage 51b from rotating the first container 60.

The second container 80 is placed on the VZH stage 51a. The VZH stage 51a moves the second container 80 in the axis-V, axis-Z, and axis-H directions.

A first bellows 84 is connected to a circumferential portion of the light-incident-side opening 82a of the second container 80. The first bellows 84 includes a bellows body 84a, a first flange 84b, and a second flange 84c. The first flange 84b is provided at one end of the bellows body 84a and fixed to the circumferential portion of the light-incident-side opening 82a. An O ring 84d is provided between the first flange 84b and the circumferential portion of the light-incident-side opening 82a. The second flange 84c is provided at the other end of the bellows body 84a and connected to a first optical path pipe 85. An O ring 84e is provided between the second flange 84c and the first optical path pipe 85.

A second bellows 86 is connected to a circumferential portion of the light-exiting-side opening 82b of the second container 80. The second bellows 86 includes a bellows body 86a, a first flange 86b, and a second flange 86c. The first flange 86b is provided at one end of the bellows body 86a and fixed to the circumferential portion of the light-exiting-side opening 82b. An O ring 86d is provided between the first flange 86b and the circumferential portion of the light-exiting-side opening 82b. The second flange 86c is provided at the other end of the bellows body 86a and connected to a second optical path pipe 87. An O ring 86e is provided between the second flange 86c and the second optical path pipe 87.

The first optical path pipe 85 and the second optical path pipe 87 are disposed as in an immobile manner. The first optical path pipe 85 and the second optical path pipe 87 cover the optical path of the laser beam, and an optical element, such as a dichroic mirror, is disposed in each of the two optical path pipes. The first bellows 84 and the second bellows 86 extend and contract or deform in such a way that the bellows allow the VZH stage 51a to move the second container 80.

The wavelength converter according to the first embodiment further includes a first purge mechanism 90 for purging the interior of the first container 60. The first purge mechanism 90 includes a gas introducing pipe 91, through which the purge gas is introduced into the first container 60, and a gas discharging pipe 92, through which the purge gas is discharged from the interior of the first container 60. The gas introducing pipe 91 and the gas discharging pipe 92 pass through the second container 80 and are connected to the first container 60.

The gas introducing pipe 91 includes a first flexible introduction pipe 91a, a fixed duct 91b, and a second flexible introduction pipe 91c. The first flexible introduction pipe 91a is connected to the container body 61 of the first container 60 and the container body 81 of the second container 80 and located therebetween and communicates with the interior of the container body 61. For example, the first flexible introduction pipe 91a is formed of a fluorine-based resin tube made of Teflon (registered trademark) or the like. The fixed duct 91b is a highly rigid duct. The fixed duct 91b has one end so connected to the container body 81 of the second container 80 that the fixed duct 91b communicates with the first flexible introduction pipe 91a. The second flexible introduction pipe 91c is so connected to the other end of the fixed duct 91b that the second flexible introduction pipe 91c communicates with the fixed duct 91b. The fixed duct 91b and the second flexible introduction pipe 91a are made of a metal material that allows no water penetration, such as SUS. That is, a portion of the gas introducing pipe 91 that is the portion outside the second container 80 is made of a material that allows no water penetration.

The gas discharging pipe 92 includes a first flexible discharge pipe 92a, a fixed duct 92b, and a second flexible discharge pipe 92c. The first flexible discharge pipe 92a is connected to the container body 61 of the first container 60 and the container body 81 of the second container 80 and located therebetween and communicates with the interior of the container body 61. For example, the first flexible discharge pipe 92a is formed of a fluorine-based resin tube made of Teflon (registered trademark) or the like. The fixed duct 92b is a highly rigid duct. The fixed duct 92b has one end so connected to the container body 81 of the second container 80 that the fixed duct 92b communicates with the first flexible discharge pipe 92a. The second flexible discharge pipe 92c is so connected to the other end of the fixed duct 92b that the second flexible discharge pipe 92c communicates with the fixed duct 92b. The fixed duct 92b and the second flexible discharge pipe 92a are made of a metal material that allows no water penetration, such as SUS. That is, a portion of the gas discharging pipe 92 that is the portion outside the second container 80 is made of a material that allows no water penetration.

The flexibility of the first flexible introduction pipe 91a and the first flexible discharge pipe 92a allow the θ stage 51b to rotate the first container 60. The flexibility of the second flexible introduction pipe 91c and the second flexible discharge pipe 92c allow the VZH stage 51a to move the second container 80.

The gas introducing pipe 91 is connected to a gas tank that is not shown and introduces a first purge gas into the container body 61 at a substantially fixed flow rate. The gas discharging pipe 92 discharges the first purge gas from the container body 61 into the atmosphere. The first purge gas is preferably argon gas, which hardly reacts with the CLBO crystal as the nonlinear crystal 50. The first purge gas can instead be helium (He) gas, neon (Ne) gas, or hydrogen ($H_2$) gas.

The wavelength converter according to the first embodiment further includes a second purge mechanism 95 for purging the interior of the second container 80. The second purge mechanism 95 includes a gas introducing pipe 96 and a gas discharging pipe 97. The gas introducing pipe 96 is connected to the first optical path pipe 85 and communicates with the interior of the first optical path pipe 85. The gas discharging pipe 97 is connected to the second optical path pipe 87 and communicates with the interior of the second optical path pipe 87.

The gas introducing pipe 96 is connected to a gas tank that is not shown and introduces nitrogen gas as a second purge gas into the first optical path pipe 85 at a substantially fixed flow rate. The second purge gas introduced into the first optical path pipe 85 is introduced into the second container 80 via the first bellows 84. The gas discharging pipe 97 discharges the second purge gas from the interior of the second container 80 into the atmosphere via the second bellows 86 and the second optical path pipe 87. The second purge gas can instead be argon gas, helium gas, or hydrogen gas.

2.2 Operation

The position of the nonlinear crystal 50 is adjusted with respect to the laser beam by driving the VZH stage 51a and the θ stage 51b provided in the position adjusting mechanism 51. Driving the θ stage 51b to rotate the first container 60 allows adjustment of the position of the nonlinear crystal 50 in the direction θ. Further, driving the VZH stage 51a to move the second container 80 allows adjustment of the position of the nonlinear crystal 50 in the axis-V, axis-Z, and axis-H directions.

The flexibility of the first flexible introduction pipe 91a and the first flexible discharge pipe 92a allows the rotation of the first container 60. The flexibility of the first bellows 84, the second bellows 86, the second flexible introduction pipe 91c, and the second flexible discharge pipe 92c allows the movement of the second container 80.

2.3 Effects

According to the first embodiment, the light incident window 63 and the light exiting window 64 of the first container 60 are spatially isolated from the position adjusting mechanism 51 via the O ring 83 as the isolation mechanism. The contamination resulting from the outgas emitted from the position adjusting mechanism 51 is thus suppressed, whereby a decrease in transparency of the light incident window 63 and the light exiting window 64 due to contamination thereof can be suppressed.

In the first embodiment, in which the first container 60 is accommodated in the second container 80 and the second container 80 is purged with a gas containing no water, water penetration through the first flexible introduction pipe 91a and first flexible discharge pipe 92a is suppressed. Entry of water into the first container 60 is therefore suppressed, whereby a decrease in the crystal life of the nonlinear crystal 50 is suppressed.

Further, in the first embodiment, in which portions of the gas introducing pipe 91 and the gas discharging pipe 92 that are the portions outside the second container 80 are made of a material that allows no water penetration, entry of water into the first container 60 is further suppressed, whereby a decrease in the crystal life of the nonlinear crystal 50 is further suppressed.

In the first embodiment, in which only the first container 60 is placed on the θ stage 51b, the load required to rotate the nonlinear crystal 50 is smaller than in a case where the first container 60 and the second container 80 are placed on the θ stage 51b. The θ stage 51b therefore allows a minute change in the angle of incidence of the laser beam incident on the nonlinear crystal 50 with small force.

3. Second Embodiment

A solid-state laser apparatus according to a second embodiment of the present disclosure has the same configuration as the configuration of the solid-state laser apparatus according to the first embodiment except that the wavelength converters in the two solid-state laser apparatuses have different configurations.

3.1 Configuration

Figure 5:
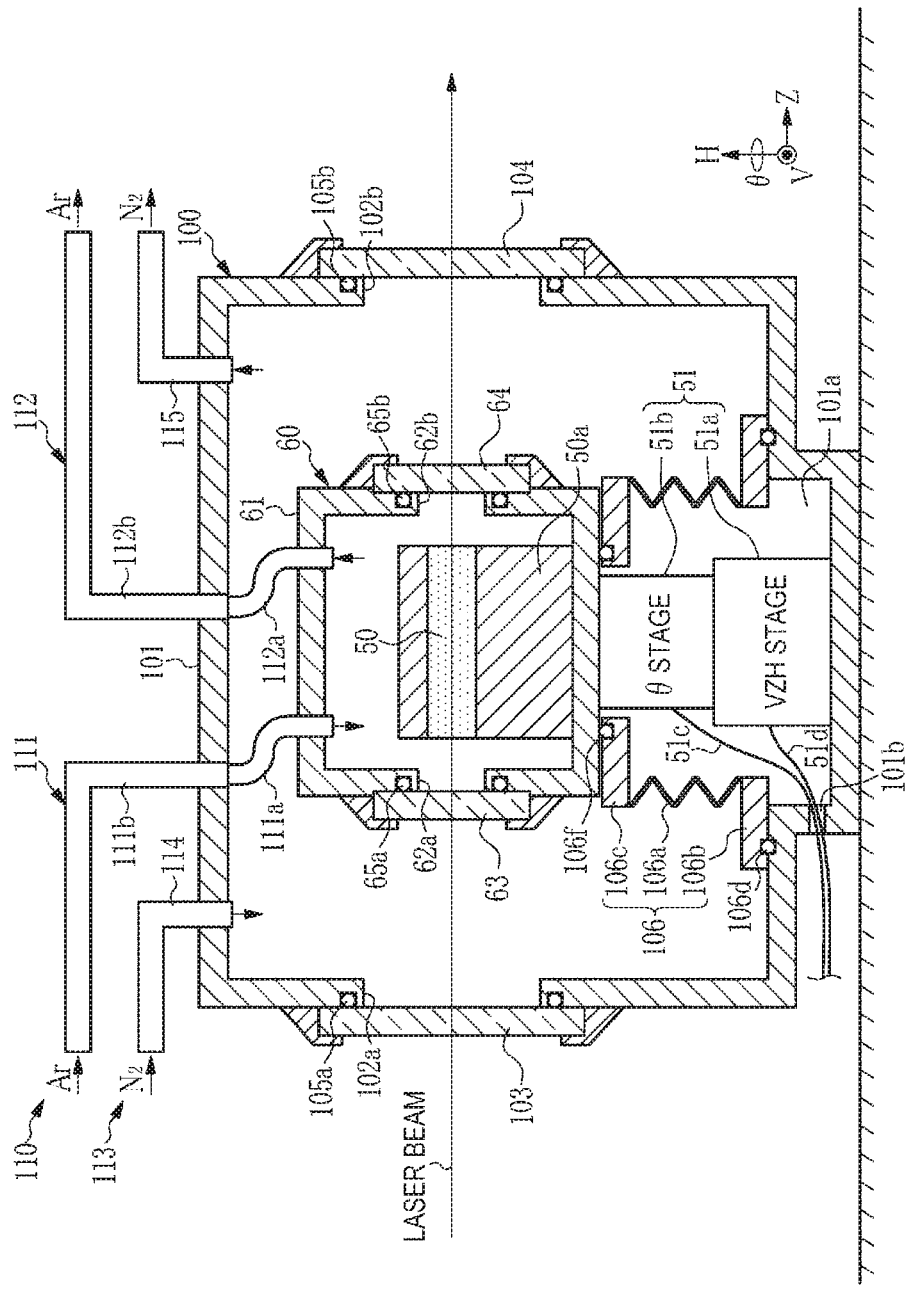
FIG. 5 shows the configuration of a wavelength converter according to a second embodiment.

FIG. 5 shows the configuration of the wavelength converter according to the second embodiment. The wavelength converter according to the second embodiment includes the crystal holder 50a, which holds the nonlinear crystal 50, the position adjusting mechanism 51, the first container 60, and a second container 100. The first container 60 has the same configuration as that of the container 60 according to Comparative Example and the first embodiment and accommodates the crystal holder 50a that holds the nonlinear crystal 50.

The second container 100 includes a container body 101, a light incident window 103, and a light exiting window 104. The container body 101 accommodates the first container 60 and the position adjusting mechanism 51. The container body 101 has a light-incident-side opening 102a so formed as to intersect the optical path of the laser beam incident on the nonlinear crystal 50. The container body 101 further has a light-exiting-side opening 102b so formed as to intersect the optical path of the laser beam that exits out of the nonlinear crystal 50. The light incident window 103 is so bonded to the container body 101 via an O ring 105a as to close the light-incident-side opening 102a. The light exiting window 104 is so bonded to the container body 101 via an O ring 105b as to close the light-exiting-side opening 102b. In the present embodiment, the second container 100 is disposed in an immobile manner.

The light incident window 103 and the light exiting window 104 are each formed of a substrate made of $CaF_2$ crystal or synthetic quartz, the two surfaces of which are coated with reflection suppressing films that are not shown. The light incident window 103 transmits the laser beam to cause the laser beam to be incident on the light incident window 63 of the first container 60. The light exiting window 104 transmits the laser beam having exited through the light exiting window 64 of the first container 60.

The position adjusting mechanism 51 includes the VZH stage 51a and the θ stage 51b. A recess 101a is formed in the bottom of the container body 101. The VZH stage 51a is placed at the bottom of the recess 101a. The θ stage 51b is placed on the VZH stage 51a. The first container 60 is placed on the θ stage 51b. The θ stage 51b rotates the container body 61 in the direction θ. A through hole 101b, through which the wiring lines 51c and 51d described above are inserted, is formed in the recess 101a.

A bellows 106 is disposed between a circumferential portion of the recess 101a of the second container 100 and the bottom surface of the container body 61 of the first container 60. The bellows 106 includes a bellows body 106a, a first flange 106b, and a second flange 106c. The first flange 106b is provided at one end of the bellows body 106a and fixed to the circumferential portion of the recess 101a. An O ring 106d is provided between the first flange 106b and the circumferential portion of the recess 101a. The second flange 106c is provided at the other end of the bellows body 106a and connected to the bottom surface of the first container 60. An O ring 106f is provided between the second flange 106c and the bottom surface of the first container 60.

The bellows 106 covers the circumference of the position adjusting mechanism 51. The O ring 106f may be a low-airtightness O ring configured not to prevent the θ stage 51b from rotating the first container 60 and the VZH stage 51a from moving the first container 60 in the axis-V and axis-Z directions. The bellows 106 extends and contracts to allow the VZH stage 51a to move the first container 60 in the axis-H direction.

In the present embodiment, the bellows 106 and the O rings 106d and 106f function as an isolation mechanism configured to spatially isolate the light incident window 63 and the light exiting window 64 of the first container 60 from the position adjusting mechanism 51.

The wavelength converter according to the present embodiment further includes a first purge mechanism 110 for purging the interior of the first container 60. The first purge mechanism 110 includes a gas introducing pipe 111, through which the first purge gas is introduced into the first container 60, and a gas discharging pipe 112, through which the first purge gas is discharged from the interior of the first container 60. The gas introducing pipe 111 and the gas discharging pipe 112 pass through the second container 100 and are connected to the first container 60.

The gas introducing pipe 111 includes a flexible introduction pipe 111a and a fixed duct 111b. The flexible introduction pipe 111a is connected to the container body 61 of the first container 60 and the container body 101 of the second container 100 and located therebetween and communicates with the interior of the container body 61. For example, the flexible introduction pipe 111a is formed of a fluorine-based resin tube made of Teflon (registered trademark) or the like. The fixed duct 111b is a highly rigid duct. The fixed duct 111b has one end so connected to the container body 101 of the second container 100 that the fixed duct 111b communicates with the flexible introduction pipe 111a. The fixed duct 111b is made of a metal material that allows no water penetration, such as SUS.

The gas discharging pipe 112 includes a flexible discharge pipe 112a and a fixed duct 112b. The flexible discharge pipe 112a is connected to the container body 61 of the first container 60 and the container body 101 of the second container 100 and located therebetween and communicates with the interior of the container body 61. For example, the flexible discharge pipe 112a is formed of a fluorine-based resin tube made of Teflon (registered trademark) or the like. The fixed duct 112b is a highly rigid duct. The fixed duct 112b has one end so connected to the container body 101 of the second container 100 that the fixed duct 112b communicates with the flexible discharge pipe 112a. The fixed duct 112b is made of a metal material that allows no water penetration, such as SUS.

The flexibility of the flexible introduction pipe 111a and the flexible discharge pipe 112a allow the θ stage 51b to rotate the first container 60 and the VZH stage Ma to move the first container 60 in the axis-V, axis-Z, axis-H directions.

The gas introducing pipe 111 is connected to a gas tank that is not shown and introduces the first purge gas described above into the container body 61 at a substantially fixed flow rate. The gas discharging pipe 112 discharges the first purge gas from the container body 61 into the atmosphere.

The wavelength converter according to the present embodiment further includes a second purge mechanism 113 for purging the interior of the second container 100. The second purge mechanism 113 includes a gas introducing pipe 114 and a gas discharging pipe 115. The gas introducing pipe 114 and the gas discharging pipe 115 each have one end connected to the container body 101 of the second container 100 and communicate with the interior of the container body 101. The gas introducing pipe 114 and the gas discharging pipe 115 are each a highly rigid fixed duct and made of a metal material that allows no water penetration, such as SUS.

The gas introducing pipe 114 is connected to a gas tank that is not shown and introduces the second purge gas described above into the second container 100 at a substantially fixed flow rate. The gas discharging pipe 115 discharges the second purge gas from the second container 100 into the atmosphere.

3.2 Operation

The position of the nonlinear crystal 50 is adjusted with respect to the laser beam by driving the VZH stage 51a and the θ stage 51b provided in the position adjusting mechanism 51. Driving the θ stage 51b to rotate the first container 60 allows adjustment of the position of the nonlinear crystal 50 in the direction θ. Further, driving the VZH stage 51a to move the θ stage 51b and the first container 60 allows adjustment of the position of the nonlinear crystal 50 in the axis-V, axis-Z, and axis-H directions. The flexible introduction pipe 111a and the flexible discharge pipe 112a allow the rotation and movement of the first container 60.

3.3 Effects

According to the present embodiment, the light incident window 63 and the light exiting window 64 of the first container 60 are spatially isolated from the position adjusting mechanism 51 via the bellows 106 and the O rings 106d and 106f as the isolation mechanism. The contamination resulting from the outgas emitted from the position adjusting mechanism 51 is thus suppressed, whereby a decrease in transparency of the light incident window 63 and the light exiting window 64 due to contamination thereof can be suppressed.

In the present embodiment, in which the first container 60 is accommodated in the second container 100 and the second container 100 is purged with a gas containing no water, water penetration through the flexible introduction pipe 111a and flexible discharge pipe 112a, which are connected to the first container 60 and the second container 100 and located therebetween, is suppressed. Entry of water into the first container 60 is therefore suppressed, whereby a decrease in the crystal life of the nonlinear crystal 50 is suppressed.

Further, in the present embodiment, in which portions of the gas introducing pipe 111 and the gas discharging pipe 112 that are the portions outside the second container 100 are made of a material that allows no water penetration, entry of water into the first container 60 is further suppressed, whereby a decrease in the crystal life of the nonlinear crystal 50 is further suppressed.

In the present embodiment, in which the second container 100 is not moved by the position adjusting mechanism 51 but is disposed in an immobile manner, the first bellows 84 or the second bellows 86 shown in the first embodiment is not required. Further, in the present embodiment, in which the second container 100 is sealed, the maintenance of the wavelength converter can be separately performed. The configuration described above minimizes a portion of the wavelength converter that is the portion exposed to the air at the time of the maintenance of the wavelength converter, whereby the period required for re-purging the second container 100 after the maintenance can be shortened.

In the present embodiment, the first optical path pipe 85 and the second optical path pipe 87 described above may be connected to the light-incident-side opening 102a and the light-exiting-side opening 102b, respectively. In this case, the light incident window 103 or the light exiting window 104 may not be provided.

4. Third Embodiment

A solid-state laser apparatus according to a third embodiment of the present disclosure has the same configuration as the configuration of the solid-state laser apparatus according to the first embodiment except that the wavelength converters in the two solid-state laser apparatuses have different configurations.

4.1 Configuration

Figure 6:
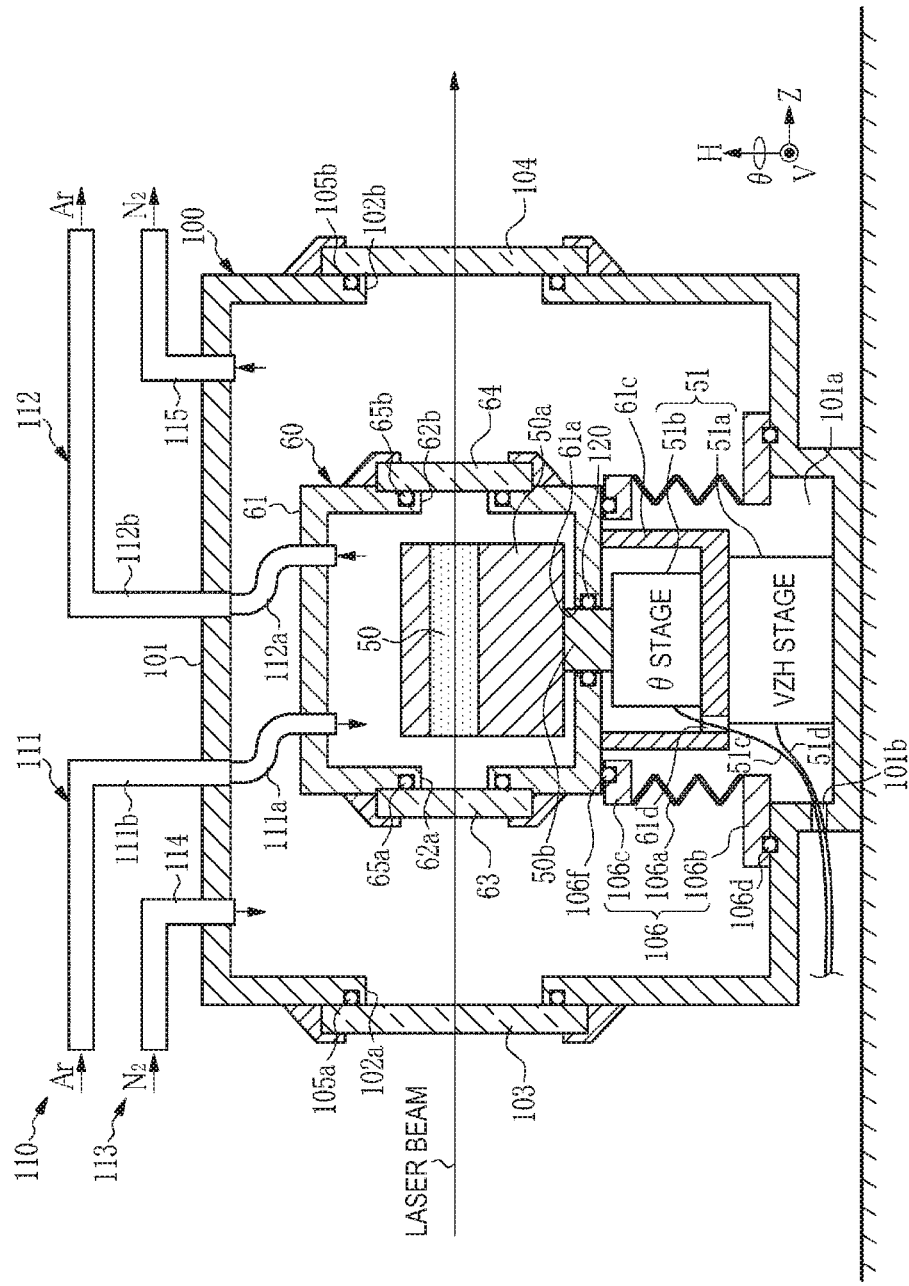
FIG. 6 shows the configuration of a wavelength converter according to a third embodiment.

FIG. 6 shows the configuration of the wavelength converter according to the third embodiment. The wavelength converter according to the third embodiment includes the crystal holder 50a, which holds the nonlinear crystal 50, the position adjusting mechanism 51, the first container 60, and the second container 100. The second container 100 has the same configuration as that of the second container 100 according to the second embodiment.

The first container 60 has the same configuration as that of the first container 60 according to the second embodiment except that a through hole 61a is provided in the bottom of the container body 61. A rotational shaft 50b is connected to the bottom of the crystal holder 50a. The rotational shaft 50b is inserted through the through hole 61a. The lower end of the rotational shaft 50b is connected to the θ stage 51b. For example, the rotational shaft 50b is made of copper. In the present embodiment, the θ stage 51b rotates the crystal holder 50a via the rotational shaft 50b.

An O ring 120 is disposed between the inner wall of the through hole 61a and the rotational shaft 50b. The O ring 120 may be a low-airtightness O ring configured not to prevent the θ stage 51b from rotating the first container 60.

A holder 61c is provided at the bottom of the container body 61. The holder 61c has a box-like shape that opens upward, and the upper end of the holder 61c is connected to the bottom of the container body 61. The holder 61c accommodates and holds the θ stage 51b. A through hole 61d, through which the wiring lines 51c is inserted, is so formed in the holder 61c. The holder 61c is placed on the VZH stage 51a.

The bellows 106 is disposed between the circumferential portion of the recess 101a of the second container 100 and the bottom surface of the container body 61 of the first container 60, as in the second embodiment. The bellows 106 has the same configuration as that in the second embodiment. The bellows 106 covers the circumference of the position adjusting mechanism 51 and the holder 61c. In the present embodiment, the O ring 106f may be a low-airtightness O ring configured not to prevent the VZH stage 51a from moving the first container 60 in the axis-V and axis-Z directions. The bellows 106 extends and contracts to allow the VZH stage 51a to move the first container 60 in the axis-H direction.

In the present embodiment, the bellows 106 and the O rings 106d and 106f function as an isolation mechanism configured to spatially isolate the light incident window 63 and the light exiting window 64 of the first container 60 from the position adjusting mechanism 51.

The wavelength converter according to the present embodiment further includes the first purge mechanism 110 for purging the interior of the first container 60 and the second purge mechanism 113 for purging the interior of the second container 100. The first purge mechanism 110 and the second purge mechanism 113 have the same configuration as those in the second embodiment.

4.2 Operation

The position of the nonlinear crystal 50 is adjusted with respect to the laser beam by driving the VZH stage 51a and the θ stage 51b provided in the position adjusting mechanism 51. Driving the θ stage 51b to rotate the crystal holder 50a allows adjustment of the position of the nonlinear crystal 50 in the direction θ. Further, driving the VZH stage 51a to move the θ stage 51b and the first container 60 allows adjustment of the position of the nonlinear crystal 50 in the axis-V, axis-Z, and axis-H directions. The flexible introduction pipe 111a and the flexible discharge pipe 112a allow the rotation and movement of the first container 60.

4.3 Effects

According to the present embodiment, the contamination resulting from the outgas emitted from the position adjusting mechanism 51 is suppressed, whereby a decrease in transparency of the light incident window 63 and the light exiting window 64 due to contamination thereof can be suppressed as in the second embodiment. Further, according to the third embodiment, entry of water into the first container 60 is suppressed, whereby a decrease in the crystal life of the nonlinear crystal 50 is suppressed as in the second embodiment.

Further, in the present embodiment, in which the θ stage 51b rotates the crystal holder 50a in place of the first container 60, the inertia force produced when the crystal holder 50a is rotated is smaller than in the other embodiments, whereby the angle of the nonlinear crystal 50 is readily adjusted in the direction θ.

4.4 Variation

Figure 7:
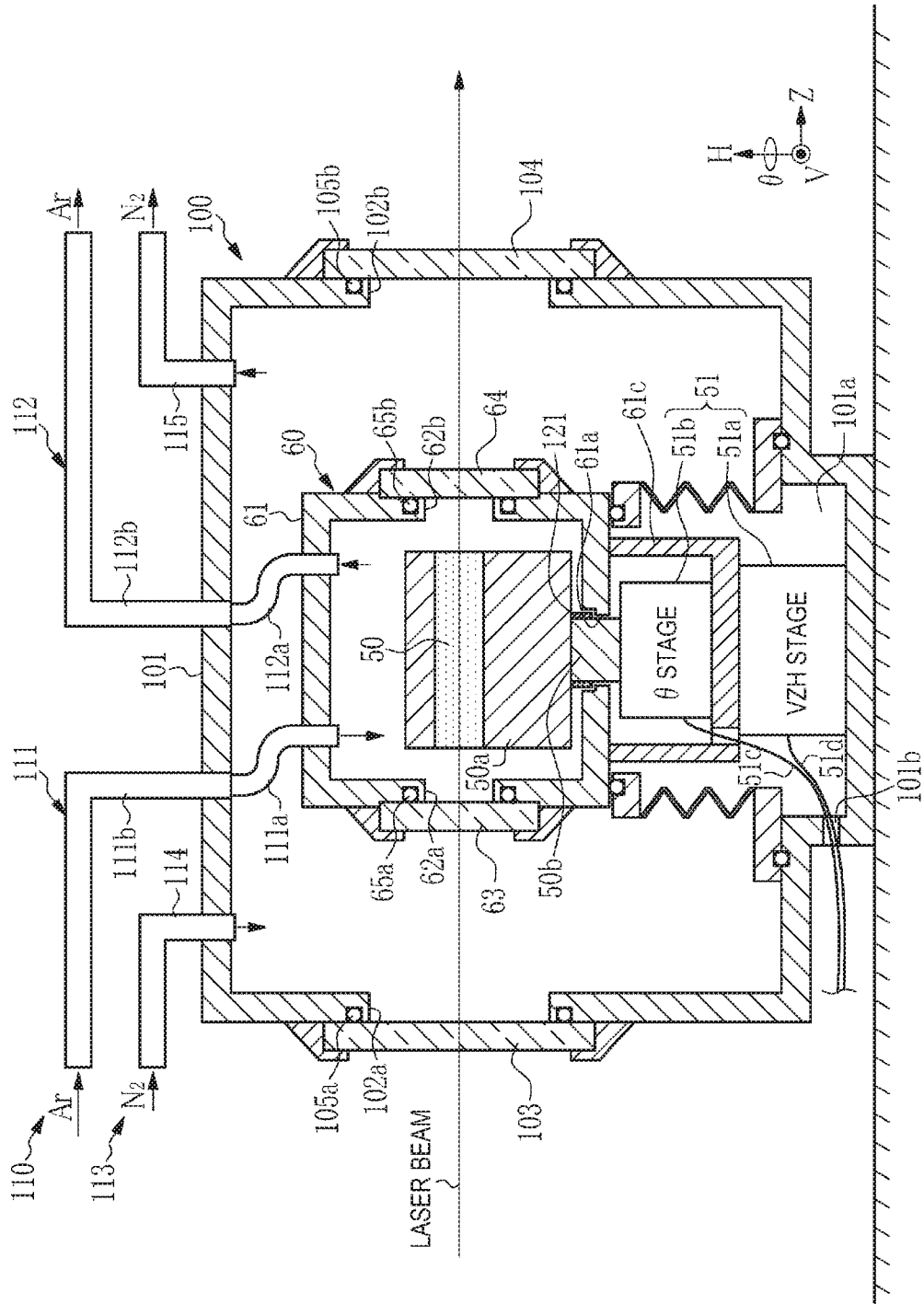
FIG. 7 shows a variation of the wavelength converter according to the third embodiment.
Figure 8:
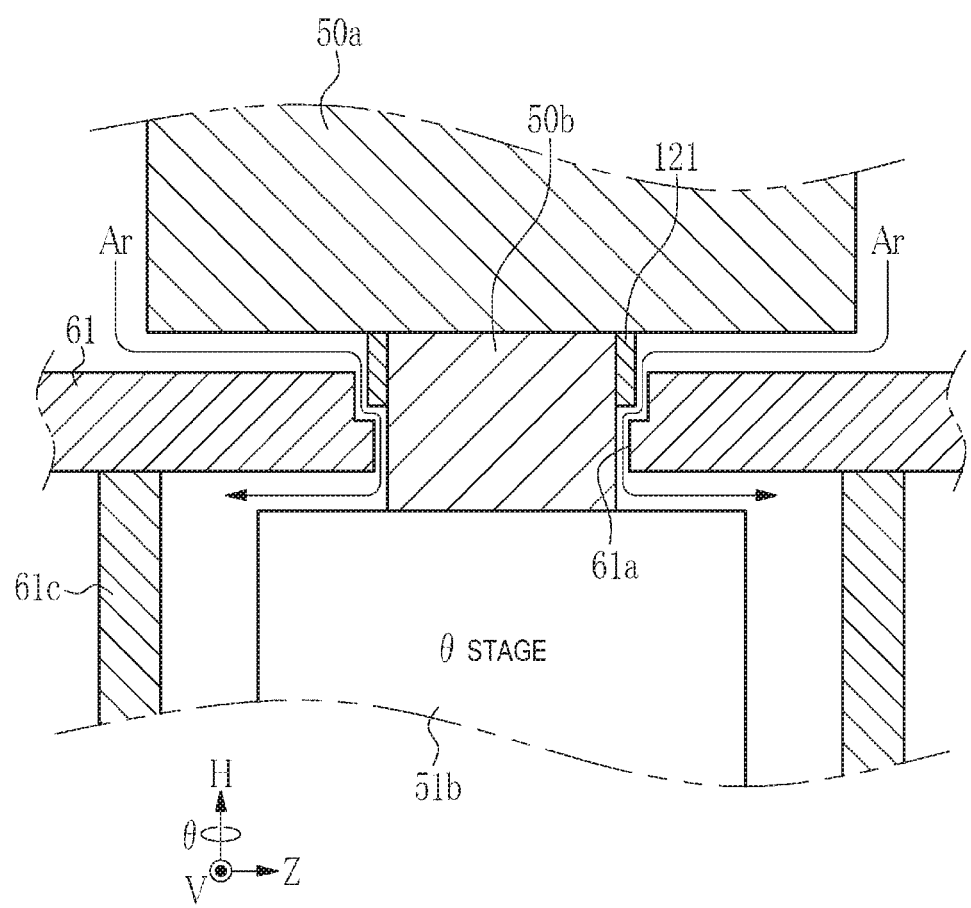
FIG. 8 is an enlarged view of a rotational shaft and therearound.

A variation of the wavelength converter according to the third embodiment will next be shown. FIG. 7 shows the configuration of the wavelength converter according to the present variation. FIG. 8 is an enlarged view of the rotational shaft 50b and therearound. The wavelength converter according to the present variation has the same configuration as that of the wavelength converter according to the third embodiment except the configurations of the rotational shaft 50b and therearound.

In the present variation, an annular ring 121 is provided around the rotational shaft 50b in place of the O ring 120. The annular ring 121 is a resin ring made, for example, of Teflon (registered trademark) or rubber or a ceramic ring. In the present variation, the airtightness is low in the space between the rotational shaft 50b and the inner wall of the through hole 61a and the space between the annular ring 121 and the inner wall of the through hole 61a, and an air gap is present in the spaces, as shown in FIG. 8.

It is preferable in the present variation that the first purge mechanism 110 adjusts the flow rate of the first purge gas with which the first container 60 is purged in such a way that the internal pressure in the first container 60 is maintained to be higher than the atmospheric pressure. The first purge gas thus flows from the interior of the first container 60 into the second container 100 via the air gaps described above. Entry of the outgas emitted from the position adjusting mechanism 51 into the first container 60 can thus be avoided.

In the present variation, in which the airtightness is low between the rotational shaft 50b and the inner wall of the through hole 61a and between the annular ring 121 and the inner wall of the through hole 61a, the resistance produced when the crystal holder 50a is rotated is small, whereby the angle of the nonlinear crystal 50 is readily adjusted in the direction θ.

In the present variation, in which the gas discharging pipe 112 is connected to the first container 60, the gas discharging pipe 112 may instead be connected to the recess 101a of the second container 100. The flow rate of the first purge gas flowing from the first container 60 into the second container 100 via the air gaps described above can therefore be increased.

5. Fourth Embodiment

A solid-state laser apparatus according to a fourth embodiment of the present disclosure has the same configuration as the configuration of the solid-state laser apparatus according to the first embodiment except that the wavelength converters in the two solid-state laser apparatuses have different configurations.

5.1 Configuration

Figure 9:
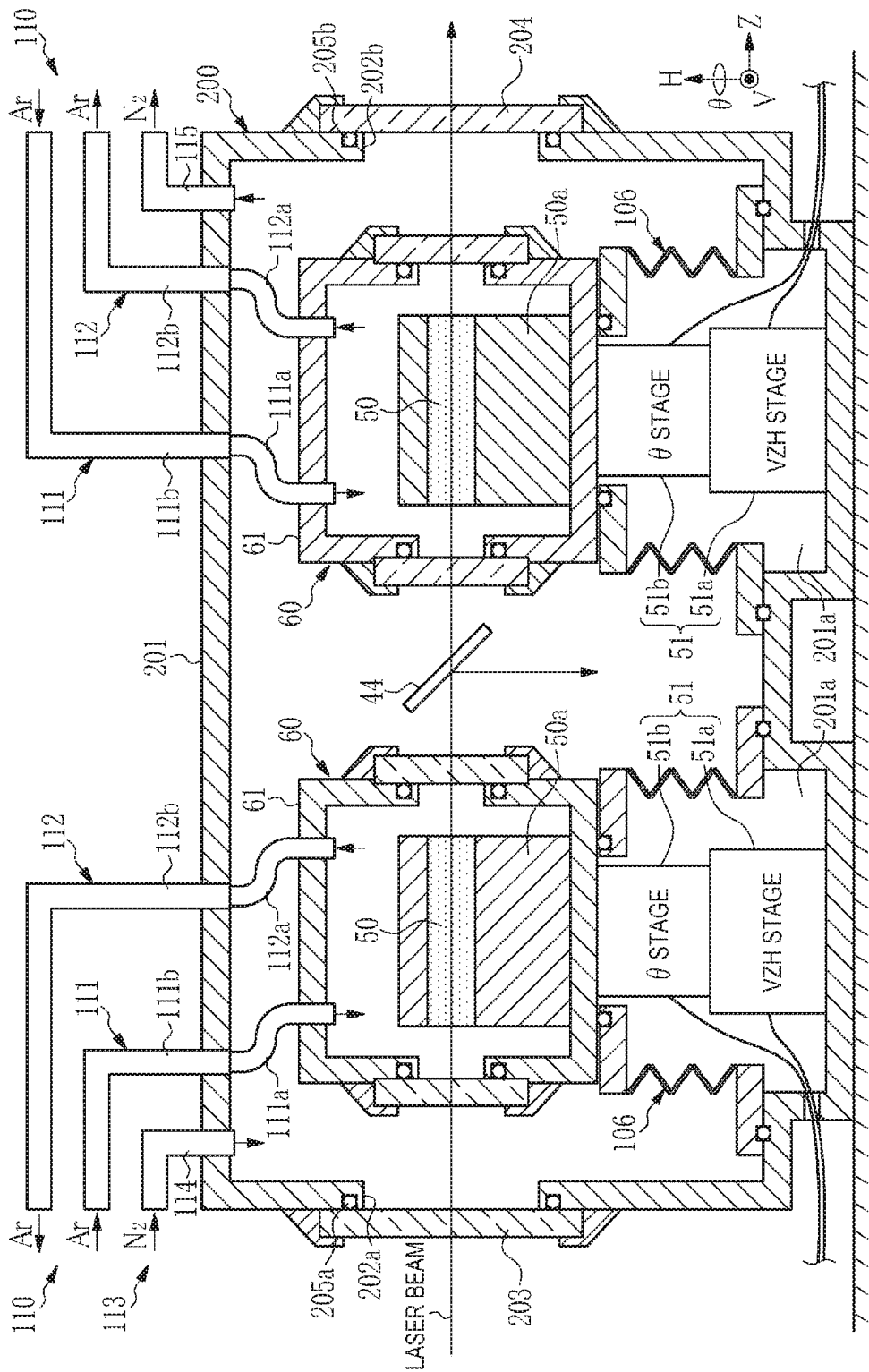
FIG. 9 shows the configuration of a wavelength converter according to a fourth embodiment.

FIG. 9 shows the configuration of the wavelength converter according to the fourth embodiment. The wavelength converter according to the fourth embodiment includes two sets of the following components in a second container 200: the crystal holder 50a, which holds the nonlinear crystal 50; the position adjusting mechanism 51; the first container 60; and the bellows 106. The crystal holder 50a, the position adjusting mechanism 51, and the first container 60 have the same configuration as those in the second embodiment.

The second container 200 includes a container body 201, a light incident window 203, and a light exiting window 204. The two nonlinear crystals 50 contained in the container body 201 are disposed along the optical path of the laser beam. The container body 201 has a light-incident-side opening 202a so formed as to intersect the optical path along which the laser beam is incident. The container body 201 further has a light-exiting-side opening 202b so formed as to intersect the optical path along which the laser beam exits. The light incident window 203 is so bonded to the container body 201 via an O ring 205a as to close the light-incident-side opening 202a. The light exiting window 204 is so bonded to the container body 201 via an O ring 205b as to close the light-exiting-side opening 202b. The second container 200 is disposed in an immobile manner.

Two recesses 201a are formed in the bottom of the container body 201. The position adjusting mechanism 51 is disposed in each of the recesses 201a, and the first container 60 is disposed on each of the position adjusting mechanisms 51. The wavelength converter according to the present embodiment includes two sets of first purge mechanisms 110. The first purge mechanisms 110 each have the same configuration as that in the second embodiment and include the gas introducing pipe 111 and the gas discharging pipe 112. The gas introducing pipe 111 and the gas discharging pipe 112 are connected to the first container 60.

The wavelength converter according to the present embodiment further includes the second purge mechanism 113 for purging the interior of the second container 200. The second purge mechanism 113 has the same configuration as that in the second embodiment and includes the gas introducing pipe 114 and the gas discharging pipe 115. The gas introducing pipe 114 and the gas discharging pipe 115 are connected to the second container 200.

Further, in the wavelength converter according to the present embodiment, an optical element is disposed in the optical path of the laser beam between the two first containers 60 in the second container 200. For example, the optical element is the first dichroic mirror 44 shown in FIG. 1. In this case, the nonlinear crystal 50 on the upstream of the first dichroic mirror 44 corresponds to the first CLBO crystal 40. The nonlinear crystal 50 on the downstream of the first dichroic mirror 44 corresponds to the second CLBO crystal 41. The optical element is not limited to the first dichroic mirror 44, and another optical element may be disposed in the second container 200.

5.2 Effects

According to the present embodiment, in which a plurality of first containers 60 and optical elements are disposed in the second container 200, the size of the wavelength converter as a whole can be reduced.

In the present embodiment, the first containers 60 and the position adjusting mechanisms 51 each having the same configuration as that in the second embodiment are accommodated in the second container 200, and the configurations described above are changeable as appropriate. Further, the number of first containers 60 accommodated in the second container 200 is not limited to two and may be three or more.

6. Various Variations

Figure 10:
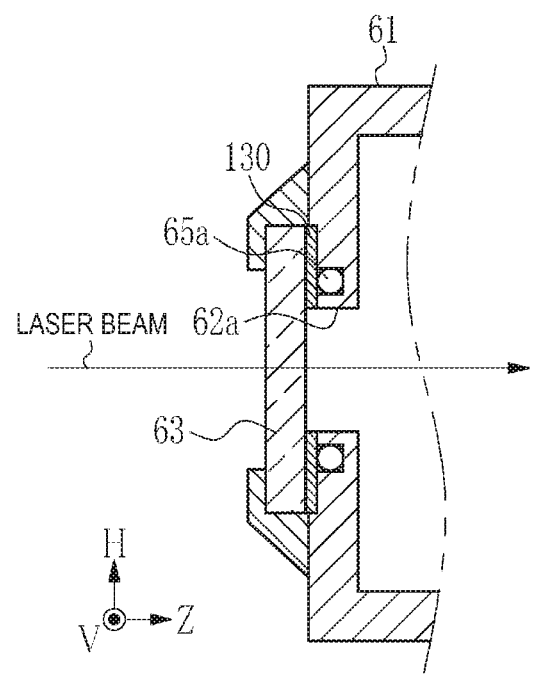
FIG. 10 is a cross-sectional view of a light incident window on which a shielding film is provided.
Figure 11:
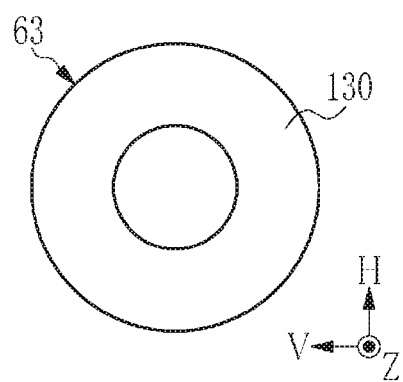
FIG. 11 is a front view of the light incident window on which the shielding film is provided.

Various variations of the embodiments described above will be described below. The light incident window 63 of the first container 60 is so bonded to the container body 61 via the O ring 65a as to close the light-incident-side opening 62a in the embodiments described above. FIG. 10 shows an example in which a shielding film 130 is formed on the light incident window 63 to prevent the O ring 65a from being irradiated with scattered light resulting from the laser beam. For example, the shielding film 130 is formed by evaporating aluminum onto the light incident window 63. The shielding film 130 is so formed in a donut shape as to correspond to the shape of the O ring 65a, as shown in FIG. 11.

As described above, forming the shielding film 130 on the light incident window 63 prevents the O ring 65a from being irradiated with the scattered light, whereby creation of organic substances produced when the O ring 65a is irradiated with the scattered light can be avoided. Contamination of the nonlinear crystal 50, the light incident window 63, and the light exiting window 64 can thus be suppressed.

The shielding film 130 is not necessarily provided only on the light incident window 63 and may further be provided on the light exiting window 64. The shielding film 130 may further be provided on the light incident window 103 and the light exiting window 104 of the second container 100 shown in FIGS. 5 to 7. Still further, the shielding film 130 may further be provided on the light incident window 203 and the light exiting window 204 of the second container 200 shown in FIG. 9.

In the embodiments described above, a fluorine-based resin tube made of Teflon (registered trademark) or the like is presented by way of example as the resin tube used as the flexible introduction pipe and the flexible discharge pipe connected to the first and second containers and located therebetween. It is also preferable to use THV as the material of the resin tube. THV is a terpolymer formed from the following three fluorine monomers: tetrafluoroethylene (TFE); hexafluoropropylene (HFP); and vinylidene fluoride (VDF).

The flexible introduction pipe and the flexible discharge pipe connected to the first and second containers and located therebetween can instead be made of a metal material that allows no water penetration, such as SUS. In the case where the flexible introduction pipe and the flexible discharge pipe are made of a metal, however, the load required when the position adjusting mechanism moves the first container could undesirably increases, and it is therefore more preferable that the flexible introduction pipe and the flexible discharge pipe are made of a resin material.

In the embodiments described above, a CLBO crystal is used as the nonlinear crystal 50, and a KBBF ($KBe_2BO_3F_2$) crystal or a BBO ($\beta$-$BaB_2O_4$) crystal can be used in place of a CLBO crystal.

The above description is intended not to be limiting but merely to exemplary. It will therefore be apparent for a person skilled in the art that the embodiments of the present disclosure can be changed without departing from the accompanying claims.

The terms used in the entire specification and accompanying claims should each be construed as a "non-limiting"

term. For example, the term "include" or "included" should be construed as "does not necessarily include only what is described." The term "have" should be construed as "does not necessarily have only what is described." Further, an indefinite article "a" described in the present specification and the accompanying claims should be construed as a term that means "at least one" or "one or more."

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. A wavelength converter comprising:
A. a crystal holder configured to hold a nonlinear crystal configured to convert a wavelength of a laser beam incident thereon and output the wavelength-converted laser beam;
B. a first container configured to accommodate the crystal holder and include a light incident window so provided as to intersect an optical path of the laser beam incident on the nonlinear crystal and a light exiting window so provided as to intersect the optical path of the laser beam having exited out of the nonlinear crystal;
C. a second container configured to accommodate the first container;
D. a position adjusting mechanism configured to adjust at least a position of the first container; and
E. an isolation mechanism configured to spatially isolate the light incident window and the light exiting window from the position adjusting mechanism;
F. a first purge mechanism configured to purge an interior of the first container with a first purge gas; and
G. a second purge mechanism configured to purge an interior of the second container with a second purge gas.

2. The wavelength converter according to claim 1, wherein the first purge mechanism includes
a first gas introducing pipe configured to pass through the second container and be connected to the first container and configured to introduce the first purge gas into the first container, and
a first gas discharging pipe configured to pass through the second container and be connected to the first container and configured to discharge the first purge gas from the first container.

3. The wavelength converter according to claim 2, wherein the first purge gas is argon gas, helium gas, neon gas, or hydrogen gas, and
the second purge gas is nitrogen gas, argon gas, helium gas, or hydrogen gas.

4. The wavelength converter according to claim 2, wherein the second purge mechanism includes
a second gas introducing pipe configured to introduce the second purge gas into the second container, and
a second gas discharging pipe configured to discharge the second purge gas from the second container.

5. The wavelength converter according to claim 2, wherein the first gas introducing pipe includes a flexible introduction pipe connected to the first container and the second container and located therebetween, and
the first gas discharging pipe includes a flexible discharge pipe connected to the first container and the second container and located therebetween.

6. The wavelength converter according to claim 5, wherein the flexible introduction pipe and the flexible discharge pipe are each a fluorine-based resin tube.

7. A wavelength converter comprising:
A. a crystal holder configured to hold a nonlinear crystal configured to convert a wavelength of a laser beam incident thereon and output the wavelength-converted laser beam;
B. a first container configured to accommodate the crystal holder and include a light incident window so provided as to intersect an optical path of the laser beam incident on the nonlinear crystal and a light exiting window so provided as to intersect the optical path of the laser beam having exited out of the nonlinear crystal;
C. a second container configured to accommodate the first container;
D. a position adjusting mechanism configured to adjust at least a position of the first container; and
E. an isolation mechanism configured to spatially isolate the light incident window and the light exiting window from the position adjusting mechanism,
wherein the position adjusting mechanism includes a rotational driver configured to rotate the nonlinear crystal to change an angle of incidence of the laser beam incident on the nonlinear crystal and a linear driver configured to linearly move the nonlinear crystal.

8. The wavelength converter according to claim 7, wherein the first container is placed on the rotational driver, and the second container is placed on the linear driver.

9. The wavelength converter according to claim 8, wherein a recess configured to accommodate the rotational driver is formed in the first container, and
the isolation mechanism is disposed between an upper end of the recess and the first container.

10. The wavelength converter according to claim 9, wherein the isolation mechanism includes an O ring.

11. The wavelength converter according to claim 7, wherein the second container is configured to accommodate the rotational driver and the linear driver, and
the first container is placed on the rotational driver, and the rotational driver is placed on the linear driver.

12. The wavelength converter according to claim 11, wherein the isolation mechanism includes a bellows configured to cover a circumference of the position adjusting mechanism and disposed between the first container and the second container.

13. The wavelength converter according to claim 12, wherein the isolation mechanism includes an O ring disposed between the bellows and the first container.

14. The wavelength converter according to claim 7,
wherein the first container is connected to the rotational driver via a through hole provided at a bottom of the first container,
the rotational driver is held by a holder provided at the bottom of the first container, and
the holder is placed on the linear driver accommodated in the second container.

15. The wavelength converter according to claim 14,
wherein the isolation mechanism includes a bellows configured to cover a circumference of the position adjusting mechanism and disposed between the first container and the second container.

16. The wavelength converter according to claim 14, further comprising:
F. a first purge mechanism configured to purge an interior of the first container with a first purge gas; and
G. a second purge mechanism configured to purge an interior of the second container with a second purge gas,
wherein the first purge mechanism holds internal pressure in the first container higher than an atmospheric pressure.

17. A wavelength converter according to claim 1, comprising:
A. a crystal holder configured to hold a nonlinear crystal configured to convert a wavelength of a laser beam incident thereon and output the wavelength-converted laser beam;
B. a first container configured to accommodate the crystal holder and include a light incident window so provided as to intersect an optical path of the laser beam incident on the nonlinear crystal and a light exiting window so provided as to intersect the optical path of the laser beam having exited out of the nonlinear crystal;
C. a second container configured to accommodate the first container;
D. a position adjusting mechanism configured to adjust at least a position of the first container; and
E. an isolation mechanism configured to spatially isolate the light incident window and the light exiting window from the position adjusting mechanism,
wherein the second container accommodates a plurality of sets of the crystal holder, the first container, the position adjusting mechanism, and the isolation mechanism.

18. The wavelength converter according to claim 1,
wherein the light incident window is connected via an O ring to a light-incident-side opening provided in a body of the first container, and
a shielding film configured to shield the O ring from scattered light resulting from the laser beam is formed on the light incident window.

19. The wavelength converter according to claim 1,
wherein the nonlinear crystal is a CLBO crystal, a KBBF crystal, or a BBO crystal.

* * * * *